Jan. 21, 1936.  G. R. ANDERSON  2,028,374
TORQUE TESTING APPARATUS
Filed Sept. 10, 1931  2 Sheets-Sheet 1
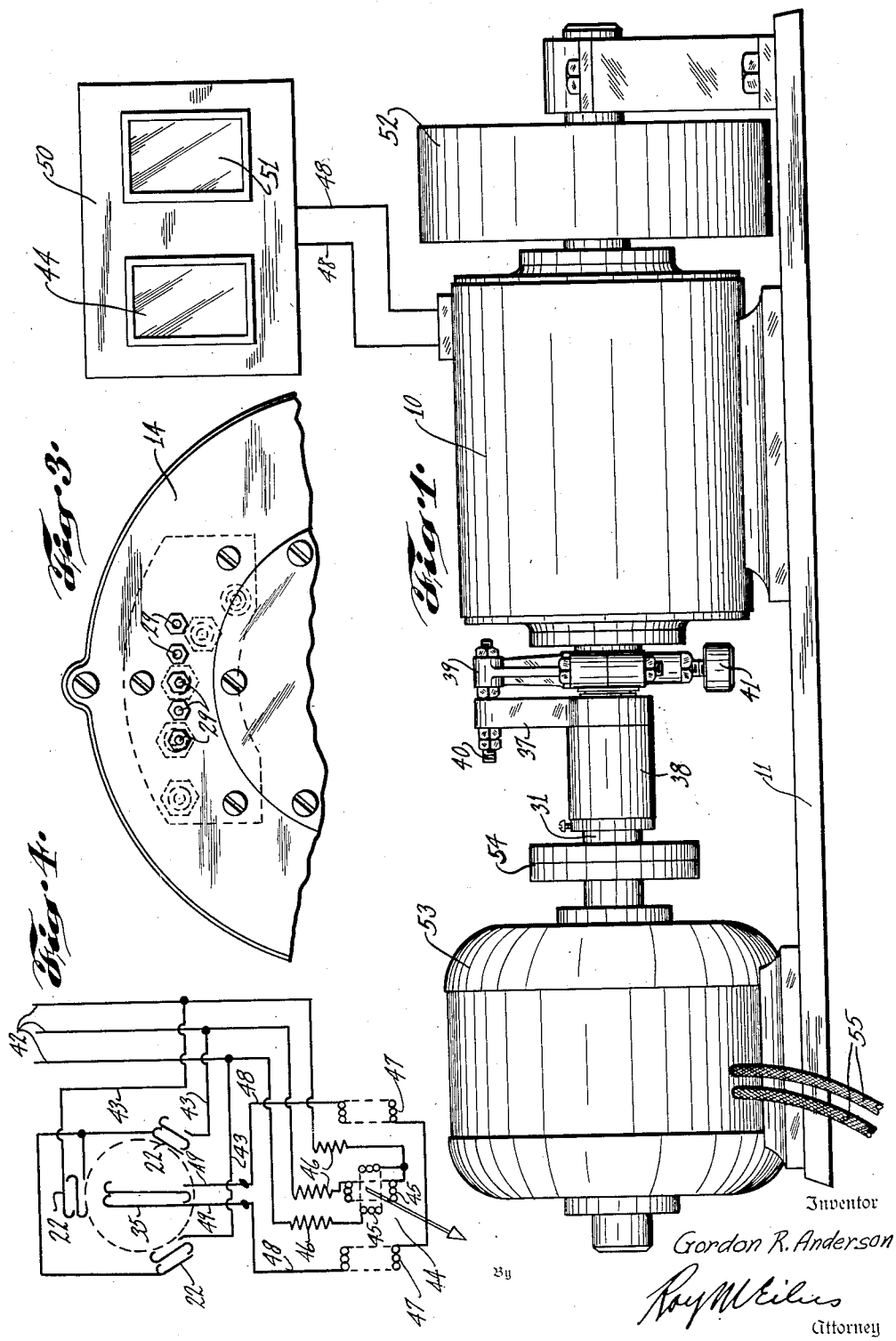
Inventor
Gordon R. Anderson
By
Roy M Eilers
Attorney

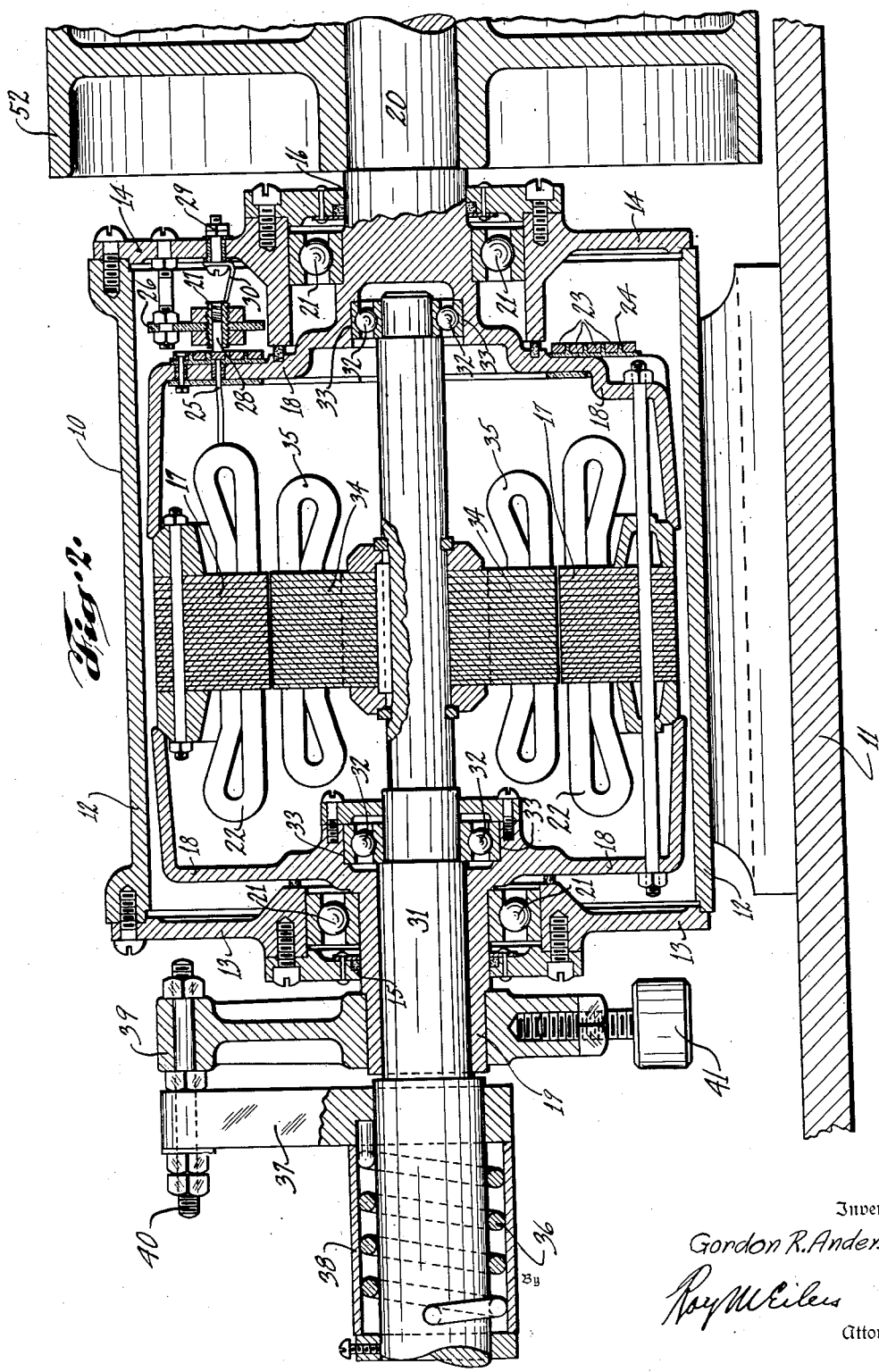

Patented Jan. 21, 1936

2,028,374

UNITED STATES PATENT OFFICE 2,028,374

TORQUE TESTING APPARATUS

Gordon R. Anderson, Beloit, Wis., assignor to Fairbanks, Morse & Co., Chicago, Ill., a corporation of Illinois Application September 10, 1931, Serial No. 562,130

15 Claims. (Cl. 265—24)

This invention relates to improvements in torque testing apparatus, and more particularly to an improved torque recording apparatus for electric machines.

An object of the present invention is to provide an improved test apparatus for recording the torque output or input of a rotary device during its periods of acceleration.

A further object is to provide an improved torque testing apparatus which includes a pair of electromagnetic elements mounted for relative rotation, one of the elements being connected to a rotary device under test, the other element being connected to a load, and means for resiliently interconnecting the two elements.

An additional object is to provide an improved torque testing apparatus which includes a pair of relatively shiftable electromagnetic elements, means for connecting one of the elements to the device under test, resilient means for interconnecting the two elements, and means for damping the natural periods of vibration of the resilient means.

Further objects and advantages will appear from the following detailed description of parts and accompanying drawings, in which:

Fig. 1 is a schematic arrangement of a preferred form of torque indicating apparatus operatively connected to a motor under test; Fig. 2 is a fragmentary longitudinal sectional elevation of the torque recording device; Fig. 3 is a fragmentary end view of a portion of the housing of the torque recording apparatus as viewed from line 3—3 in Fig. 1, and Fig. 4 is a diagram of a preferred electric circuit arrangement employed in connection with the torque recording apparatus.

Referring by numerals to the drawings, 10 designates, generally, a preferred form of torque recording apparatus, which is detachably mounted upon a table 11 or the equivalent. The torque recording apparatus is suitably enclosed in a housing 12 which is provided with end bearing arm brackets 13 and 14 having centrally disposed openings 15 and 16, respectively. A laminated core 17 is secured to a frame structure 18 which is provided on its opposite sides with an outwardly extending sleeve 19 and shaft portion 20, which project through and beyond the end openings 15 and 16, respectively. It will be apparent that the frame structure 18 is journaled in ball-bearings 21 mounted in the bearing arm brackets, and that this core assembly is freely rotatable in respect to the stationary housing 12. The core assembly 17 is provided with a three phase coil winding 22 which is inserted in the suitable core slots. It will be readily understood that the laminated core assembly 17 which includes the coil windings 22 constitutes the primary electromagnetic element. A plurality of slip rings 23 are carried on an outer wall of frame 18, these rings being suitably insulated from each other and from the frame by means of an insulating block 24. Each slip ring is provided with a slip ring terminal 25 which extends through and into the interior of the frame structure 18, these terminals being suitably insulated from each other and from the frame by means of insulating sleeves and blocks. It will, of course, be understood that the three leads from the windings 22 are electrically connected, respectively, to three of the terminals 25. A brush-holder bracket 26 is adjustably secured to and spaced from the bearing arm 14 in adjacence to the slip rings 23. This brush-holder is, by preference, formed of insulating material, and is arranged to support adjustably a plurality of individual brush assemblies 27 which each include a spring pressed brush 28 arranged to contact with its associated slip ring. Terminals 29 are threadedly secured to the bearing arm 14, each terminal being electrically connected to its associated brush by means of leads 30. Obviously, the terminals 29 are suitably insulated from each other and the housing by means of suitable insulating sleeves.

A shaft 31 is suitably journaled in ball-bearings 32 which are mounted in oppositely disposed receses 33 formed in the frame 18. This shaft is extended through and beyond the sleeve portion 19 of the frame 18. A laminated core assembly 34 is keyed to the shaft 31, the core serving to support a single phase coil winding 35 in suitably formed core slots. Obviously, the laminated core assembly 34 including the coil winding 35 constitutes the secondary electromagnetic element. It will be apparent that the primary and the secondary are mounted for relative rotation within the casing 12 for a purpose hereinafter appearing. The winding 35 is electrically connected to a pair of the slip ring terminals 25 by means of a suitable flexible conductor to permit an appreciable angular deflection between the primary and the secondary. Driving connection between the shaft 31 and the core assembly 17 is effected by means of a spring 36 which is securely attached at its one end to the shaft 31 while its other end is securely attached to an arm member 37 which is loosely carried on the shaft 31. This torsional spring is, by preference, helical in form, having its outside diameter ground accurately to provide a clearance of a few thousandths of an inch between the outside diameter of the spring and an accurately bored damping sleeve 38 for a purpose hereinafter appearing. It will be apparent that any tendency to rotate shaft 31 is transmitted through the spring 36 to the arm 37 which is secured to an arm member lever 39 keyed to the sleeve portion 19 of the frame structure 18. These arm members are rigidly secured together by means of a pin 40 which is disposed on a radius taken from the axis of the shaft 31. A counterweight 41 is adjustably secured to the arm 39 to compensate for the unbalanced effect of the lever arms 37 and 39.

The above described apparatus is connected into circuit relation as best appears in Fig. 4. A three phase source of power (not shown) is electrically connected to the three phase windings 22 by means of conductors 42, terminals 29, leads 30, brushes 28, slip rings 23, terminals 25 and leads 43. Obviously, the three phase windings 22 are excited from the external three-phase source of power by means of the above circuit arrangement. Torque recording instrument 44 is provided with a pair of movable coils 45 which are electrically connected to the external three phase source of power by means of leads 42, each lead being connected in series with resistances 46, respectively. The winding 35 is interconnected in series relation with coils 47 by means of leads 48, terminals 29, leads 30, brushes 28, slip rings 23 and leads 49. The torque recording meter 44 is supported on a suitable panelboard 50, the position finder of the instrument being arranged to visibly indicate or record the torque data on suitable movable charts. It will be apparent that a suitable speed indicating or recording meter 51 may be supported on the panelboard 50. This meter may be suitably connected to a tachometer (not shown) which is operatively associated with the shaft of the torque testing apparatus for recording the speed. It will be apparent that the torque apparatus 10 includes a pair of electromagnetic elements which are mounted on concentric cores, one of which revolves with the apparatus under test, and the other with a load. In the present example, a simple flywheel 52 is keyed to the shaft portion 20 of the frame 18. It will, of course, be understood that any suitable method of loading may be employed, but from experience it has been found that the present flywheel type of loading is entirely satisfactory.

The above described torque recording apparatus may be properly calibrated by connecting the shaft 31 to a suitable dynamometer and simultaneously recording the torque output of the dynamometer and the reading of the meter 44. It will, of course, be understood that the torque output of any rotary device may be recorded by the use of the torque recorder, but for convenience and clearness of description, the operation of the torque recorder will be explained in connection with a motor 53 under test. This motor is, by preference, detachably mounted upon the table 11, the shaft of the motor being operatively connected to the shaft 31 of the testing apparatus by means of a flexible coupling 54. Obviously, the motor 53 is electrically connected to a suitable source of power (not shown) by means of leads 55. When the motor circuit is closed, the motor shaft begins to revolve the shaft 31 of the testing apparatus. Since the primary of the apparatus 10 is only indirectly connected to the shaft 31 by means of the spring 36, and due to the relatively large rotational inertia of the frame 18 and flywheel load 52, the primary does not immediately begin to revolve. This delayed movement causes an angular deflection between the electromagnetic circuits of the testing apparatus. Obviously, the spring 36 is capable of transmitting the torque output of the motor under test and produces an angular deflection proportional to the torque. The angular deflection of the spring is equal to the angular deflection between the primary and secondary, which produces a phase shift proportional to the torque, which is recorded upon the meter. This angular deflection varies with the torque output of the motor. As above noted, the spring 36 is accurately finished and is mounted so as to eliminate any distortion due to centrifugal forces. The sleeve 38 serves to damp any fluctuations being transmitted through it which may be caused by the natural periods of vibrations of any of the external parts. When the torque to be transmitted through the spring is constant, the outside diameter of the spring is reduced, but any reversal or change in the torque causes an increase in the outside diameter of the spring which is limited by the braking action of the sleeve. Therefore, by eliminating approximately half the cycle of any periodic oscillation, natural periods of vibration are eliminated, but still permitting all variation of positive torque to be transmitted.

It will be apparent that the testing apparatus 10 when employed to record the torque output of a motor or other rotary device functions as an induction generator with a varying phase shift between the primary and secondary of the machine depending upon the torque output of the device under test. By supplying excitation to the primary, the present apparatus may be employed as an induction motor of varying phase shift to record the torque necessary to start and run a given load. It will, of course, be apparent that several sizes of springs may be interchangeably mounted on the shaft 31 to take care of various ranges of torque. The present testing apparatus will quickly and accurately record the torque of a rotary device to be tested under unstable as well as stable speed conditions.

It will, of course, be understood that the present detailed description of parts and the accompanying drawings relate to only a single preferred executional embodiment of the invention and that alterations may be made in the described arrangement and construction of parts without departing from the spirit and full intended scope of the invention.

I claim:

1. In a torque testing apparatus for rotary devices, inductively coupled electromagnetic elements mounted one within the other for concurrent rotation, means connecting one of said elements to a machine under test, a resilient member connecting said elements, means associated with the other of said elements constituting a loading therefor and tending to cause a change in the electrical phase relation of the said elements during test, means for indicating a variable electrical phase shift between said elements, upon operation of the machine, and an electric circuit connecting said indicating means with one of said electromagnetic elements.

2. In a torque testing apparatus for rotary machines, a pair of inductively coupled electromagnetic elements arranged for concurrent rotation in relative, variable angular displacement, means detachably connecting one of said elements to the machine under test, a torsional resilient member, means connecting such member between the electromagnetic elements, said resilient member being arranged for deflection proportional to the input torque of the machine under test, means constituting a loading for the other of said elements, tending to effect a variable electrical phase shift between said elements during their operation, a meter for indicating the phase shift between said elements, and an electric circuit connecting said meter with one of said electromagnetic elements.

3. In a torque testing apparatus of electrical type, a driving member and a driven member, a pair of inductively related electromagnetic elements including windings movable respectively with said driving and driven members, said elements being arranged for rotation and variable angular displacement, resilient means interconnected between said elements, a sleeve member frictionally coacting with said resilient means for damping vibration through said resilient means, and means for loading one of said members, tending to cause a variable electrical phase shift between said elements as the members are rotated.

4. In a torque testing apparatus, a primary assembly, a shaft, a secondary assembly carried on said shaft, said assemblies being arranged for concurrent rotation, a spring fitted on said shaft and having one end secured thereto, a sleeve member mounted on said spring for damping vibrations of said spring, a lever attached to the other end of said spring and to the primary assembly, and a loading means comprising a flywheel connected to one of said assemblies.

5. In a torque testing apparatus for rotary machines, a primary assembly including an electromagnetic element, a shaft, a secondary assembly carried on said shaft and including an electromagnetic element, said assemblies being coaxially mounted with their electromagnetic elements inductively arranged, a load, means connecting the primary assembly to the load, means detachably connecting the secondary assembly to the machine under test, resilient means interconnecting said assemblies in mutual angularly displaceable relation, said resilient means having one end connected to said shaft, a lever, elements by which the lever is operatively connected to said primary assembly and to said resilient means, and means for indicating the angular relation of said assemblies.

6. In a torque testing apparatus for rotary machines, a pair of rotatably disposed, concentrically and inductively related electromagnetic elements, a resilient member permitting a variable angular relation between said elements, individual coil windings for each element, one of said windings being of polyphase type and of a type distinct from the other winding, slip rings carried by one of said elements, a meter, conductors connecting said slip ring and meter, and driving connections from the said elements, respectively, to a load, and to a machine under test.

7. In a torque testing apparatus of electrical type, a casing, a primary assembly including a winding, a secondary assembly, concentrically arranged with said primary assembly, and including a winding in inductive relation to the first said winding, bearings and coacting elements for rotatably supporting said assemblies in angularly displaceable relation in said casing, a lever on said primary assembly, a shaft for said secondary assembly, a spring connecting said shaft and lever, and a loading element associated with one of said assemblies, and tending to effect a variable angular displacement of said assemblies during operation of the apparatus.

8. In a torque testing apparatus, a primary assembly, a secondary assembly, means for permitting relative rotation between said assemblies, a shaft for said secondary assembly, resilient means having one end attached to said shaft, a lever, elements by which the lever is operatively connected to said primary assembly and to said resilient means, and means for adjustably counterbalancing said lever.

9. In a torque testing apparatus, a driving member and a driven member, a primary element having a three phase coil winding, a secondary element having a single phase coil winding inductively related with said three phase coil winding, said elements being movable with said driving and driven members, a resilient member connecting said driving and driven members, and means for permitting a variable phase shift between said elements.

10. In a torque testing apparatus, a primary assembly including a three phase coil winding, a secondary assembly including a single phase coil winding, said assemblies being mounted for concurrent rotation in variably displaced relation, a resilient means connecting said assemblies, a meter, and circuit means, including slip rings, conductors and brushes, interconnecting said assemblies and meter.

11. In a torque testing apparatus, a primary assembly including a three phase coil winding, a secondary assembly including a single phase coil winding, said assemblies being mounted for relative rotation, a shaft for said secondary assembly, means including a spring for flexibly connecting said shaft and primary assembly, a plurality of slip rings carried by said primary assembly, individual circuit connections between said coils and slip rings, a meter, and electric circuit means interconnecting certain of said slip rings and meter.

12. In a torque testing apparatus, a driving member and a driven member, a primary assembly including a three phase coil winding, means for electrically connecting said winding to a source of power, a secondary assembly including a single phase winding inductively related with said primary assembly, said assemblies being mounted for rotation with said driving and driven members, a recording meter, means for electrically connecting said single phase winding to said meter, a torsion spring and coacting elements, by which the spring is operatively connected to said assemblies, and adapted to permit a variable phase shift of said windings, proportionate to the loading of one of said assemblies.

13. In a torque testing apparatus for rotary devices, a casing, a primary assembly including an electromagnetic winding, a frame for said primary assembly, friction reducing means for rotatably supporting said frame and primary assembly in said casing, said frame being provided with a sleeve on one end, extending through the casing, a secondary assembly including an electromagnetic winding, a shaft for said secondary assembly extending through said sleeve, friction reducing means for supporting said secondary assembly in said frame, the windings of said assemblies being inductively related and mounted for rotation with said frame and shaft, a lever on said sleeve, and means including a spring interconnecting said shaft and lever, to permit a limited relative angular displacement thereof.

14. In a torque testing apparatus of electrical type, a primary assembly including a polyphase electromagnetic element, a frame member for said primary assembly, a sleeve member carried by said frame, a shaft member connected to said frame, anti-friction bearings for rotatably supporting said primary assembly and members, a shaft, a secondary assembly carried on said shaft and including a single phase electromagnetic element, in inductive relation to the polyphase electromagnetic element in said primary assembly, a lever carried by said sleeve, and a spring operatively interconnecting said shaft and lever.

15. In a torque testing device of electrical type, a driving member and a driven member, two concentric, inductively related electromagnetic elements mounted for rotation with said driving and driven members, each provided with a coil winding, said windings being of different phase type, and resilient means interconnecting said members for permitting a variable electrical phase shift between said elements.

GORDON R. ANDERSON.